United States Patent [19]

Badger

[11] 4,228,592
[45] Oct. 21, 1980

[54] MEASURING TOOL ESPECIALLY FOR CARPENTERS

[76] Inventor: Harold J. Badger, R.F.D. 2, Box 71, Dover Foxcroft, Me. 04426

[21] Appl. No.: 48,484

[22] Filed: Jun. 14, 1979

[51] Int. Cl.³ .......................... G01B 5/14; G01B 3/02; B25H 7/00
[52] U.S. Cl. .......................... 33/174 G; 33/DIG. 10; 33/180 R; 33/427; 33/464
[58] Field of Search ........ 33/180 R, DIG. 10, 174 G, 33/174 B, 197, 430, 427, 464, 443

[56] References Cited

U.S. PATENT DOCUMENTS

| | | | |
|---|---|---|---|
| D. 230,628 | 3/1974 | Sunley | 33/DIG. 10 |
| 1,115,333 | 10/1914 | Pease | 33/32 C |
| 1,612,455 | 12/1926 | McGeorge | 33/180 P |
| 2,432,300 | 12/1947 | Ellis | 33/174 B |
| 2,540,032 | 1/1951 | Johnson et al. | 33/174 G |
| 2,909,843 | 10/1959 | Bechtel | 33/174 B |
| 3,103,747 | 9/1963 | La Sierra | 33/174 B |
| 3,389,474 | 6/1968 | Linn | 33/174 G |
| 3,672,064 | 6/1972 | Elkins | 33/180 R |
| 3,678,588 | 7/1972 | Isola | 33/180 R |
| 3,842,510 | 10/1974 | Elliott | 33/180 R |

FOREIGN PATENT DOCUMENTS

| | | | |
|---|---|---|---|
| 440516 | 2/1927 | Fed. Rep. of Germany | 33/197 |
| 129611 | 1/1927 | Switzerland | 33/443 |

*Primary Examiner*—Harry N. Haroian
*Attorney, Agent, or Firm*—W. G. Fasse; D. F. Gould

[57] ABSTRACT

The present measuring tool facilitates the work of a carpenter, especially panelling work by a direct measuring and reading of the position of cut-outs that are to be made in any type of panel, for example to accommodate utility outlets and other openings. For this purpose a runner or slider is movable along a T-square. A readout window is provided in one face of the runner to directly read the runner position from the scale marking on the T-square. The runner or slider simultaneously has a hole therethrough which forms a template, for example, for standard electrical outlet boxes. Thus, the carpenter may directly work on the panel a hole to be cut into the panel without even memorizing the measurements. A set screw or the like may be used to lock the runner on the leg of the T-square once the runner or slider has been properly positioned on the T-square leg whereby the locked position of the runner acts as a memory for the reading.

10 Claims, 6 Drawing Figures

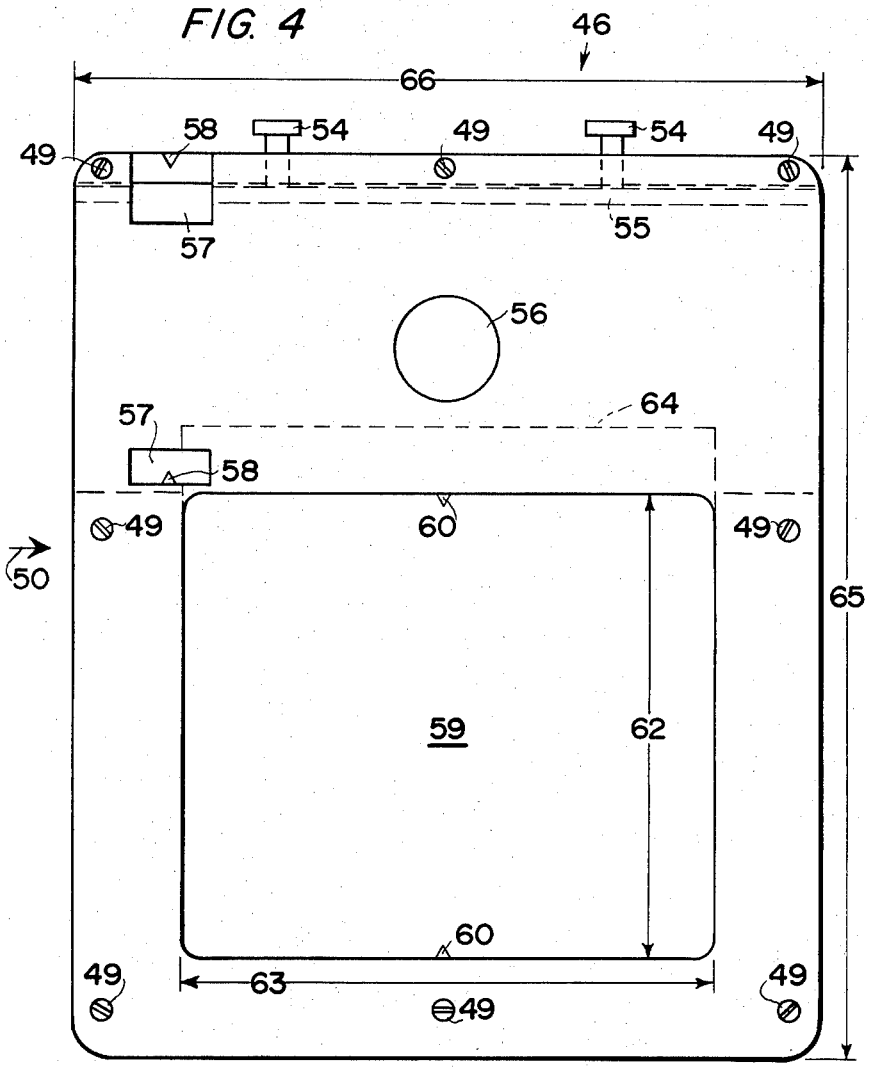
FIG. 4
FIG. 5
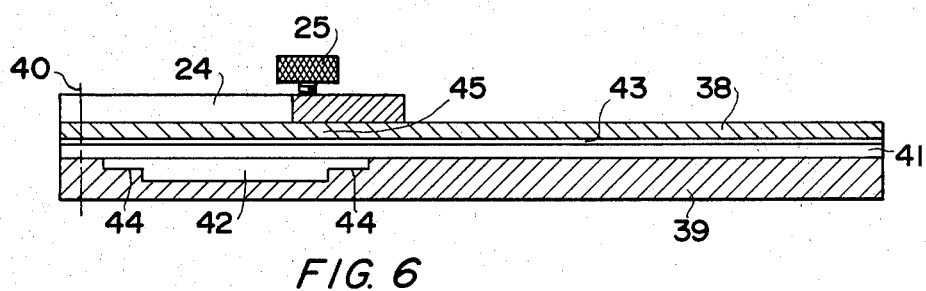
FIG. 6

MEASURING TOOL ESPECIALLY FOR CARPENTERS

BACKGROUND OF THE INVENTION

The present invention relates to a measuring tool, especially for carpenters. More specifically, the present tool facilitates any work that involves cutting wall panels to the desired shape or to cut holes into a wall panel.

It is known to combine a ruler with a so-called trysquare to form a combination square of which the trysquare is movable back and forth along the ruler. It is also known that slide rules have a runner, the markings of which facilitate the reading across the scales on the slide rule and on the tongue of the slide rule. However, the just described tools are not suitable for the purposes of marking cut-outs in wall panels such as finishing wall panels, wallboard, sheetrock, and the like.

Heretofore it has been customary to measure the location, for example, of an electrical outlet or the like, or the lengths necessary for determining the shape of the panels, for example, around a window, by means of a measuring tape relative to a corner or to the respective studs in the walls to which the outlet or the like is connected. Such measuring is based on the assumption that the studs are equally spaced by a distance which is constant from stud to stud. The measurements correspond to a positive image.

These measurements are then used for marking the back of the panel as a negative, so to speak, whereby substantial time may be necessary for the several converting steps. Due to using the positive measurements and converting them to draw the respective negative on the back of the panel, it is easy to make mistakes and once a hole has been cut into the panel in a wrong position or when the panel has been cut into a wrong shape the panel becomes useless for the intended purpose in both instances. When the panel is to be cut into a particular shape, for example, to fit around a window or a door, the panel is usually wasted if the panel does not fit after cutting.

OBJECTS OF THE INVENTION

In view of the above it is the aim of the invention to achieve the following objects singly or in combination:

to provide a measuring tool especially for carpenters which will avoid the above mentioned problems;

to provide a conventional T-square with a slide or runner which simultaneously functions as a template for the marking of panels;

to construct a runner with guide channels for receiving one or two T-squares so that the T-square or squares and the runner may be positioned relative to each other for locating the position of cut-outs and the like in walls for then using the position of the T-square or squares relative to the runner for marking purposes; and to construct a template type runner for a T-square which will accommodate T-squares of different sizes in an adjustable guide channel.

SUMMARY OF THE INVENTION

The runner or slide for a T-square according to the invention, comprises a guide channel or several guide channels for the T-square or T-squares and a readout window for reading a scale on a T-square. An aperture extends through the runner or slide and is located in such a position as to form a marking template.

The leg of a T-square fits movably into the guide channel of the runner whereby either the runner is adjustable relative to the length of the T-square or, if two T-squares run through two respective guide channels in the runner at two different levels, the T-squares are adjustable relative to the runner.

With the aid of the present tool it is now possible to directly mark, for example, the location of an electrical outlet box on the back of a wall panel.

BRIEF FIGURE DESCRIPTION

In order that the invention may be clearly understood, it will now be described, by way of example, with reference to the accompanying drawings, wherein:

FIG. 4 shows a slide or runner adapted for cooperation with a single T-square;

FIG. 5 is a side view in the direction of the guide channel of the embodiment of FIG. 4; and FIG. 6 is a sectional view along section line 6—6 in FIG. 3.

DETAILED DESCRIPTION OF PREFERRED EXAMPLE EMBODIMENTS AND OF THE BEST MODE OF THE INVENTION

Figure 1:
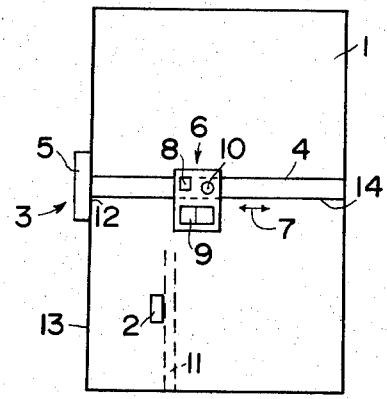
FIG. 1 shows a top plan view of an embodiment of the present tool with one T-square located relative to a wall panel.

FIG. 1 shows a top plan view of the present tool positioned relative to a wall panel 1 into which there is to be cut a hole 2, for example for an electrical outlet box. The present tool comprises a T-square 3 having a leg 4 and a squaring bar 5. The tool further comprises a runner 6 which is movable back and forth along the leg 4 of the T-square in the direction of the arrow 7. The runner 6 which may also be referred to as a slide comprises a readout window 8 and a marking template aperture 9 as well as a locking screw 10.

In conventional construction the hole 2 in the panel will provide access to an electrical outlet which is secured to a stud 11 shown in dashed lines in FIG. 1.

In operation the inner edge 12 of the square bar 5 is aligned with the center of a stud to which the edge 13 of the panel 1 is to be secured. The T-square 3 is then moved into such a position that the lower edge 14 is aligned with the top edge of the electrical outlet. The slide or runner 6 is then moved along the leg of the T-square until the electrical outlet appears in the template aperture 9. The locking screw 10 is then tightened and it is not even necessary for the carpenter to take a reading because the position of the slide or runner 6 will define the location of the electrical outlet horizontally from the edge 13 of the panel 1. The vertical distance of the outlet from the floor or from the lower edge of the panel is a standard dimension and hence need not be measured. However, a modified version of the present tool may be used for measuring both, horizontal and vertical spacings.

Figure 2:
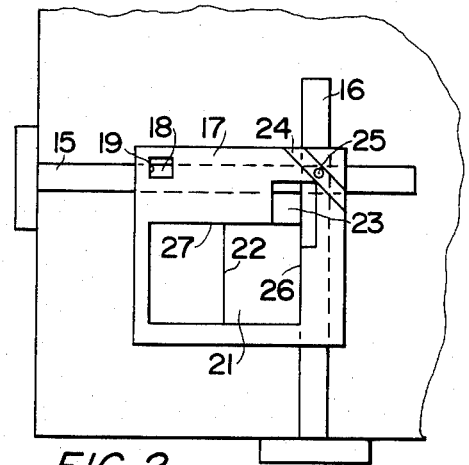
FIG. 2 illustrates a second embodiment of the present invention in which two T-squares are accommodated by a single slide.

FIG. 2 shows an embodiment in which such horizontal and vertical spacings may be measured by means of two T-squares 15 and 16 adjustable in the slide 17 independently of each other. The slide 17 has a readout window 18 the left edge 19 of which is aligned with the left-hand vertical edge of the template aperture 21 in FIG. 2. This aperture 21 has a horizontal width corresponding, for example, to that of a double electrical outlet box. A guide wire 22 may divide the aperture 21 so that it may be used for marking a single outlet box or a double outlet box. A further readout window 23 is so located that it permits the reading of the scales of both T-squares. A cross strap 24 is so located that both T-squares and the slide 17 may be locked relative to each other by means of a set screw 25 as will be described in more detail with reference to FIG. 6. The inner edge of the leg of the T-square 16 is aligned with its left edge with the edge 26 of the aperture 21. The lower edge of the T-square 15 is not aligned with the edge 27 of the aperture 21. However, if desired, the lower edge of the T-square 15 and the edge 27 may also be aligned with each other as shown in FIG. 3 at 32.

Figure 3:
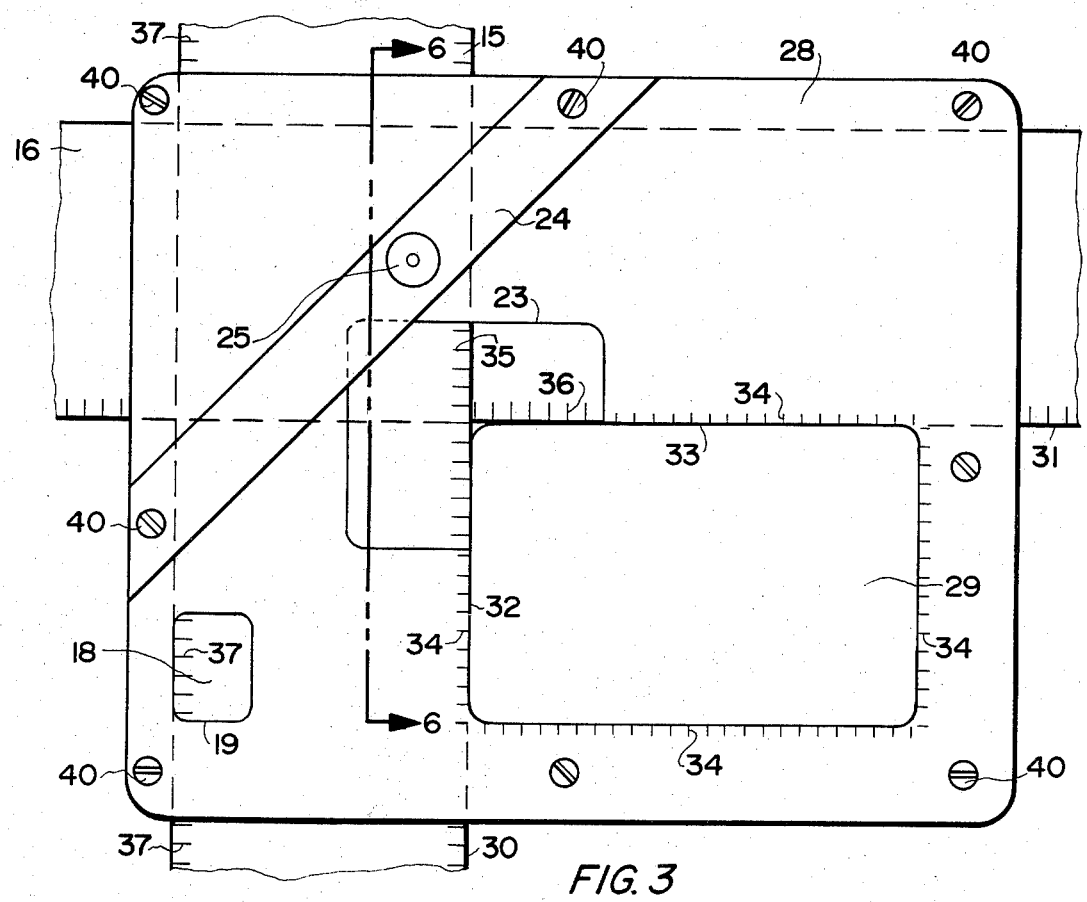
FIG. 3 shows the embodiment of FIG. 2 on an enlarged scale.

FIG. 3 shows a slide or runner 28 which is of substantially the same construction as the slide 17 in FIG. 2 except that the aperture 29 is dimensioned for a single electrical outlet. Both inwardly facing edges 30 and 31 of the T-squares 15 and 16 are aligned with the respective edges 32 and 33 of the template aperture 29. In addition the edges of the template aperture are provided with length unit scales 34. The respective length unit scales 35 and 36 of the T-squares 15 and 16 are visible in the read-out window 23. The elements that are identical in FIGS. 2 and 3 have the same reference numbers. A length unit scale 37 on the T-square 15 is visible in the readout window 18.

The present slides or runners may be made of aluminum or of suitable plastics material, whereby two plates 38 and 39 may be held together by screws 40 which also hold the strap 24 at its ends as best seen in FIG. 3.

Referring to FIG. 6 the two plates 38 and 39 are provided with guide channels 41 and 42 respectively for the legs of the T-squares 15 and 16. These channels 41 and 42 are provided with shoulders 43 and 44 on which the T-square will be guided. These shoulders 43, 44 may be so arranged as to contact the respective T-square leg in an area where there are no scale markings on the T-square. Intermediate the shoulders which actually provide guide railings for the T-square, the latter does not contact the guide channel thereby reducing the friction. The thickness of the plate 38 in the area of the guide channel 41 is such that a pressure exerted by the screw 25 will press the portion 45 of the plate 38 sufficiently downwardly against both T-squares, not shown in FIG. 6, to lock the runner or slide and the T-squares relative to one another.

FIGS. 4 and 5 show an embodiment of a slide or runner 46 constructed for cooperation with a single T-square not shown. Again two plates 47, 48 are held together by screws 49. Incidentally, FIG. 5 is a view in the direction of the arrow 50 in FIG. 4.

In the embodiment of FIGS. 4 and 5 only one of the plates, namely 48, is provided with a guide channel 51 having shoulders or guide rails 52 and a width 53 which is adjustable by means of adjustment screws 54 which position a guide bar 55 to thereby vary the width 53 to accommodate T-squares of different dimensions.

A locking screw 56 locks the slide 46 relative to the T-square not shown.

Windows 57 with pointers 58 provide a readout for scales on the T-square. The template aperture 59 is also provided with pointers 60 which facilitate the marking of a single electrical outlet although the template aperture 50 is of a size corresponding to a double outlet box. The template aperture 59 has a height 62 and a width 63 corresponding to the dimensions of a double electrical outlet box. It will be appreciated, that these dimensions are example dimensions only which may be changed, for example, to standard built in vacuum cleaner outlets or the like. Further, the windows 57 may be increased in size as indicated by the dashed line 64 so as to read the scale on the T-square, for example along the entire length 63 of the template aperture 59. The height 65 of the template may be for example, six inches and its width 66 may be, for example, five inches. The plates 47 and 48 may each have a thickness of, for example, 3/16 of an inch. The dimensions of the guide channels will depend on the sizes of conventional T-squares.

Although the invention has been described with reference to specific example embodiments, it will be appreciated, that it is intended to cover all modifications and equivalents within the scope of the appended claims.

What is claimed is:

1. A runner for a T-square, comprising guide channel means for the T-square, readout window means in said runner for reading a scale on said T-square, and aperture means extending through said runner, said aperture means being located in said runner so as to form marking template means, said aperture means being bounded by straight edges, said guide channel means having longitudinal channel defining walls at least one of which coincides with one of said straight edges bounding said aperture means, whereby said at least one channel defining wall forms a tangent relative to any marking made directly through said aperture means.

2. The runner of claim 1, wherein said runner further comprises length measuring scale markings on said straight edges.

3. The runner of claim 2, wherein said straight edges form said aperture means with rectangular corners.

4. The runner of claim 1, wherein said guide channel means comprise guide railing means for contacting said T-square whereby the contact between the T-square and the runner is reduced to respectively reduce friction.

5. The runner of claim 1, further comprising pointer means operatively arranged relative to said marking template means for facilitating the marking of a workpiece.

6. The runner of claim 1, further comprising locking means for locking said runner in any position along said T-square.

7. The runner of claim 1, wherein said readout window means comprise readout facilitating pointer means.

8. The runner of claim 1, further comprising means for adjusting the clearance defined by said guide channel means for accommodating T-squares of different size.

9. A measuring tool especially for carpenters, comprising T-square means having a leg with a scale thereon and a squaring bar secured at right angles to one end of said leg, runner means, guide channel means extending through said runner means, said T-square leg fitting movably into said guide channel means whereby the runner is adjustable in its position along the length of the T-square leg, readout window means in at least one side face of said runner means for reading a scale on said T-square leg, and aperture means extending through said runner means, said aperture means being positioned in said runner means to form a marking template for marking a location on a piece of material, said aperture means being bounded by straight edges, said guide channel means having longitudinal channel defining walls at least one of which coincides with one of said straight edges bounding said aperture means, whereby said at least one channel defining wall forms a tangent relative to any marking made directly through said aperture means.

10. The measuring tool of claim 9, wherein said guide channel means of the runner means comprise two guide channels extending at right angles to each other in different vertical planes so that two T-squares are independently adjustable in the respective guide channel.

* * * * *

UNITED STATES PATENT OFFICE
CERTIFICATE OF CORRECTION

Patent No. 4,228,592            Dated October 21, 1980

Inventor(s) Harold J. Badger

It is certified that error appears in the above-identified patent and that said Letters Patent are hereby corrected as shown below:

ON THE TITLE PAGE:

"[57] ABSTRACT", line 12, "work" should be --mark--.

Signed and Sealed this

Twenty-fourth Day of November 1981

[SEAL]

*Attest:*

GERALD J. MOSSINGHOFF

*Attesting Officer*      *Commissioner of Patents and Trademarks*